Jan. 16, 1962     E. C. HORTON     3,016,557
WINDSHIELD CLEANING SYSTEM
Filed Nov. 13, 1958
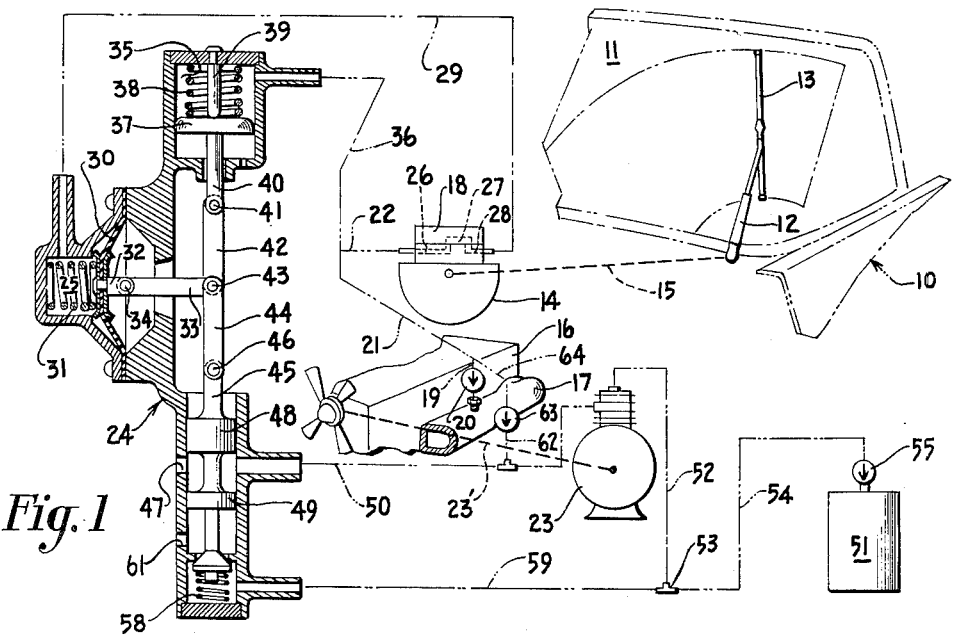
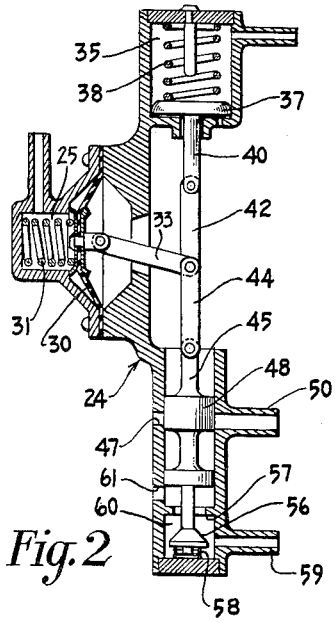
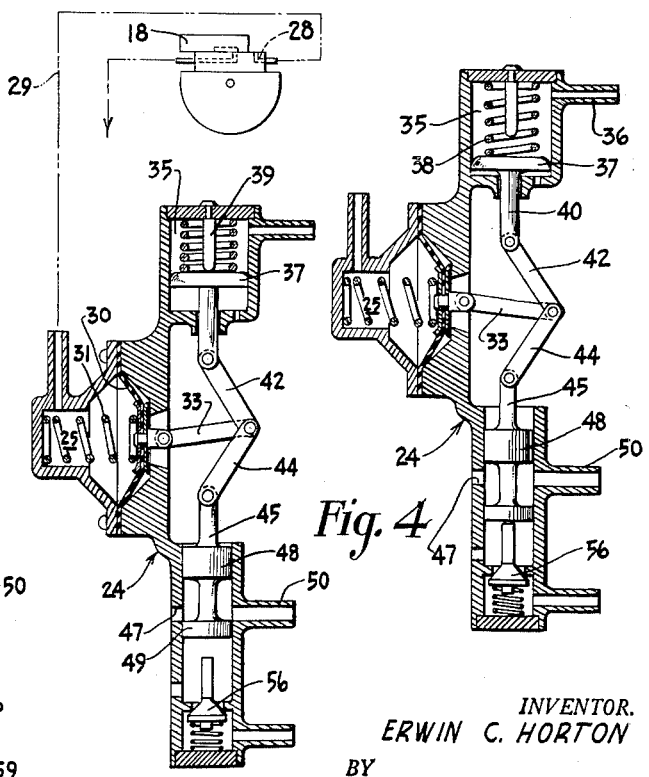
INVENTOR.
ERWIN C. HORTON
BY Bean Brooks Buckley & Bean
ATTORNEYS

United States Patent Office 3,016,557
Patented Jan. 16, 1962

3,016,557
WINDSHIELD CLEANING SYSTEM
Erwin C. Horton, Hamburg, N.Y., assignor to
Trico Products Corporation, Buffalo, N.Y.
Filed Nov. 13, 1958, Ser. No. 773,617
6 Claims. (Cl. 15—250.12)

This invention relates to a fluid pressure operated windshield wiper system.

The subject matter of the present invention constitutes an improvement over the system described in the co-pending application of Martin Bitzer and Anthony R. D'Alba, Serial No. 773,618 filed November 13, 1958. In the above mentioned system, a windshield wiper motor, actuated primarily by engine intake manifold vacuum, always produces a satisfactory speed output because a control which is responsive to manifold vacuum automatically substitutes the vacuum produced by the intake side of a compressor for the manifold vacuum when the latter falls below a control point. However, when this substitution takes place, the compressor output must be vented to relieve compression pressure of the compressor so that it will be effective as a vacuum pump to evacuate the wiper motor when a compressed air tank associated with the compressor is full. This venting, being responsive to manifold vacuum, therefore also takes place when the wiper motor is not in operation with the attendant result that the full output of compressed air from the compressor may not be transmitted to a partially full compressed air tank, or if the tank is full, then the compressor does needless work in compressing the air which is subsequently vented to the atmosphere. In other words, in the above described system, the functioning of the compressed air system is always influenced by part of the windshield wiper system even if the wiper system is not in operation.

It is accordingly the object of the present invention to provide a vacuum operated windshield wiper system in which a manifold vacuum responsive control causes the vacuum produced by the intake of the compressor of a compressed air system to drive a vaccum wiper motor when the manifold vacuum which normally drives the motor is reduced below a value which would effect normal operation of the windshield wiper motor, the control, however, enabling completely independent and normal operation of the compressed air system uninfluenced by the reduction in manifold vacuum when the wiper motor is not in operation. Other objects and attendant advantages of the present invention will readily be perceived hereafter and the invention will be more fully understood when the following portions of the specification are read in conjunction with the accompanying drawings wherein:

FIG. 1 is a schematic view, partially in perspective and partially in cross-section, of the improved system of the present invention, the valve shown therein being in the position which it assumes when engine intake manifold vacuum actuates the wiper motor;

FIG. 2 is a cross-sectional view showing the position which the valve of FIG. 1 assumes when the wiper motor is on and the intake of the compressor actuates the wiper motor in response to a low manifold vacuum;

FIG. 3 is a cross-sectional view showing the position which the valve of FIG. 1 assumes when the wiper motor is off and the manifold vacuum is high; and FIG. 4 is a cross-sectional view showing the position which the valve of FIG. 1 assumes when the wiper motor is off and the manifold vacuum is of the same value as in FIG. 2, the fact that the wiper motor is off permitting the compressed air system to be completely uninfluenced by the low manifold vacuum.

In FIG. 1 a portion of an automotive vehicle 10 is shown having a windshield 11 thereon. A wiper arm 12 mounting a wiper blade 13 is adapted to be actuated by vacuum motor 14 through linkage 15 in any well known manner. Motor 14 may be of any conventional vacuum operated type, such as disclosed in Patent # 2,803,225. The vacuum for motor operation is obtained primarily from intake manifold 17 of vehicle engine 16.

When it is desired to place motor 14 into operation, slide valve 18, which is connected to a suitable Bowden wire unit or the like having the other end thereof mounted on the vehicle dashboard, is moved to the position shown in FIG. 1. When the vacuum in engine intake manifold 17 is of a sufficiently high value, this vacuum will be communicated to motor 14 through conduit 19 (in which check valve 20 is mounted), conduit 21 and conduit 22.

A compressor 23' is coupled to any suitable moving part of engine 16 through a linkage 23. This linkage may be a belt extending between a pulley on the crank shaft of the vehicle and a pulley on the shaft of the compressor, as more fully depicted in the above mentioned co-pending application. It will be appreciated that whenever engine 16 is in operation, compressor 23 will be driven.

Whenever the engine intake manifold is of sufficient magnitude to cause motor 14 to operate above a predetermined minimum speed, control valve 24 will be in the position shown in FIG. 1. More specifically, the manifold vacuum in communication with motor 14 will also be in communication with chamber 25 of valve 24 through conduit 19, check valve 20, conduit 21, conduit 22, conduit 26 in motor 14, groove 27 in slide valve 18, conduit 28 in motor 14 and conduit 29. The existence of manifold vacuum in chamber 25 will cause flexible diaphragm 30 to be deflected to the position shown in FIG. 1 against the bias of spring 31, which is effectively mounted between one end of chamber 25 and flexible diaphragm 30. A link 32 has one end thereof affixed to diaphragm 30, the other end thereof being pivotally attached to link 33 by pin 34. Furthermore, the manifold vacuum communicates with chamber 35 of valve 24 through conduit 19, check valve 20, conduit 21, and conduit 36. When the manifold vacuum is high, piston 37, which forms one end of chamber 35, will be pulled upwardly against the bias of spring 38 until it abuts the lower end of pin 39. Rigidly affixed to piston 37 is one end of link 40, the other end of which mounts pin 41. A link 42 has one end thereof mounted on pin 41 and the other end thereof mounted on pin 43 at the end of link 33. It will readily be appreciated that pins 41 and 43 permit pivotal movement of link 42 relative to links 40 and 33, respectively.

When links 33 and 42 are in the position shown in the drawing because of the existence of high manifold vacuum in intake manifold 17, link 44 which has one end thereof mounted on pin 43 for pivotal movement relative to links 33 and 42 will be in the position shown. The other end of link 44 is pivotally mounted relative to spool valve 45 by pin 46. Since links 33, 42 and 44 assume the position shown in FIG. 1, spool valve 45 will permit the atmosphere to communicate with the intake of compressor 23 through vent 47 in valve 24, the chamber between spool valve portions 48 and 49, and conduit 50. The output of the compressor communicates with compressed air tank 51 through conduit 52, T 53, conduit 54, and check valve 55.

It will readily be appreciated that if the compressed air tank 51 is only partially full, the air which is compressed by compressor 23 will be transmitted to said tank. However, if the compressed air tank 51 is full, the piston (not shown) in the compressor 23 will merely reciprocate without delivering any air to the tank system and therefore without taking in air through the above described path. More specifically, the air within the compression chamber of compressor 23 will be compressed on the compression stroke of the compressor and will expand on the intake stroke, the expansion of the compressed air partially returning the work exerted on it during compression to cause compressor 23 to consume a relatively small amount of energy while it is running.

However, there are times during operation of the wiper system when the manifold vacuum is reduced which, in turn, will cause the speed of the motor to be reduced. When this reduction in manifold vacuum is to the point where it is insufficient to hold piston 37 against pin 39, valve 45 will assume the position shown in FIG. 2. More specifically, the relatively low intake manifold vacuum is communicated to chamber 35 through the above described path shown in FIG. 1. Spring 38 will, therefore, be permitted to expand and drive piston 37 downwardly. It is to be noted, however, that spring 31 in chamber 25 is relatively weak, so that the reduced manifold vacuum sensed in chamber 25 will still be sufficient to cause diaphragm 30 to be deflected to the left. When diaphragm 30 and piston 37 are in the position shown in FIG. 2, link 33 will cause links 42 and 44 to retain their in-line position while link 40 affixed to piston 37 causes them to move downwardly. The downward movement of links 42 and 44 will be accompanied by a corresponding movement of spool valve 45. The elongated portion 48 of spool valve 45 will disrupt communication between vent 47 and conduit 50. Therefore, the air requirements for compressor 23 can no longer be obtained through this path. The downward movement of spool valve 48 will also result in the unseating of poppet valve 56 from its seal 57 against the bias of spring 58. This will permit the output side of compressor 23 (FIG. 1) to be vented to the atmosphere through conduit 52, T 53, conduit 59, chamber 60 of valve 24, and venting aperture 61.

It will be noted that the intake conduit 50 of compressor 23 is coupled to vacuum motor 14 through conduit 62, check valve 63, conduit 64, conduit 21, and conduit 22. Since the output side of compressor 23 is vented to the atmosphere, as described above, the compressor may take in air. This air is taken in from wiper motor 14 through the above described path. It is to be noted, however, that when this situation exists, check valve 20 leading from the intake manifold 17 is closed and check valve 63 is open because the vacuum produced by the intake side of compressor 23 is greater than the intake manifold vacuum. Thus, compressor 23 provides vacuum for operation of motor 14 under conditions of reduced manifold vacuum.

In FIG. 3, the position which valve 24 assumes when the wiper motor is not in operation and the manifold vacuum is high, is shown. More specifically, when the wiper motor is turned off, slide valve 18 will be moved to the position wherein it permits conduit 28 to be vented to the atmosphere. Thus, the atmosphere will be in communication with chamber 25 of valve 24 through conduit 28 and conduit 29. The weak spring 31 will, therefore, cause diaphragm 30 to be deflected to the right and also cause a corresponding movement of link 33 to the right, which in turn causes links 42 and 44 to assume the position shown in FIG. 3. Since the high manifold vacuum is still in communication with chamber 35 through the above described path, piston 37 will still be in its uppermost position abutting the end of pin 39. The movement of links 33, 42 and 44 to the position shown in FIG. 3 will merely cause spool valve 45 to be moved upwardly a slight amount from its position shown in FIG. 1. However, the chamber between enlarged portions 48 and 49 of spool valve 45 permits communication between vent 47 and conduit 50 leading to the intake side of compressor 23, and valve 56 prevents the compressor output from being vented. Therefore, the compressor will continue to operate in the same manner described above relative to FIG. 1.

It will readily be appreciated that when the wiper motor 14 is in operation, the compressor 23 supplies vacuum for operation of the motor in response to a reduction in manifold vacuum, as sensed by valve 24. However, in accordance with the object of the present invention, valve 24 prevents compressor 23 from being influenced in any way by the manifold vacuum when the wiper motor is not in operation. More specifically, if there is a reduction in manifold vacuum when the wiper motor is not in operation, valve 24 does not permit the compressor 23 to be vented to the atmosphere. Thus, if the compressed air tank 51 is only partially full, the compressor will continue to supply compressed air thereto, notwithstanding a reduction in manifold vacuum. Furthermore, as discussed above, in the event that the compressed air tank 51 is full, the compressor will run, but will not take in any air.

FIG. 4 depicts the position which valve 24 assumes when the manifold vacuum drops and the wiper motor is off. When the wiper motor is on and the manifold vacuum drops, the compressor is vented to the atmosphere as shown in FIG. 2. However, when the wiper motor is off, this venting does not occur. More specifically, when the wiper motor is off, chamber 25 of valve 24 is in communication with the atmosphere through conduits 28 and 29 (FIG. 3). Therefore, link 33 will be in its position to the right (FIGS. 3 and 4). However, when the manifold vacuum is reduced, the vacuum in chamber 35 is also reduced and spring 38 causes piston 37 to move downwardly. However, since link 33 was previously moved to the right, the out-of-line position between links 42 and 44 will be preserved so that the downward movement of piston 37 and link 40 affixed thereto does not cause a sufficient downward movement of spool valve 45 to cause enlarged portion 48 thereof to disrupt communication between intake aperture 47 and conduit 50 leading to the compressor 23. Furthermore, the downward movement of spool valve 45 is not sufficient to unseat valve 56. It can thus be seen that when the wiper motor is off, a reduction in manifold vacuum will not result in the venting of compressor 23. In other words, the low manifold vacuum in no way affects the independent operation of the compressed air system when the wiper motor is not in operation.

While a preferred embodiment of the present invention has been described, it is to be understood that it is not limited thereto, but may be otherwise embodied within the scope of the following claims.

What is claimed is:

1. A vehicle windshield wiper system comprising a windshield wiper, a wiper motor for driving said wiper, a source of vacuum generally providing energy for said motor, means for causing said motor to be either in an operating or a non-operating condition, a compressor for providing a source of compressed air for the operation of vehicle accessories, and control means for effectively coupling the intake side of said compressor to the operating wiper motor in response to the fluctuation of the vacuum in said source to a magnitude which would tend to cause the speed of the motor to be reduced below a predetermined value, said control means being effective for permitting completely independent operation of said compressor regardless of the magnitude of the vacuum at said source when said motor is in a non-operating condition.

2. A vehicle windshield wiper system comprising a windshield wiper, a wiper motor coupled to said wiper, a source of vacuum for generally driving said motor within a given range of speeds, means for causing said motor to be either in an operating or a non-operating condition, a compressor for providing a source of compressed air for the operation of vehicle accessories, and control means for both substituting the vacuum produced by the intake of said compressor for the vacuum of said source and for venting the output of said compressor when the vacuum at said source fluctuates to a magnitude which would cause the speed of the motor to fall below said given range of speeds, said control means preventing the venting of said compressor regardless of the magnitude of the vacuum at said source when said motor is in a non-operating condition.

3. A vehicle windshield wiper system comprising a windshield wiper, a wiper motor for driving said wiper, a source of vacuum generally providing energy for said motor, means for causing said motor to be either in an operating or a non-operating condition, a compressor for providing a source of compressed air for the operation of vehicle accessories, and control means for causing said compressor to be placed in condition to provide vacuum for operating said motor when the vacuum in said source fluctuates to a magnitude which would tend to cause the motor speed to be reduced below a predetermined value, said control means being effective for permitting completely independent operation of said compressor regardless of the magnitude of the vacuum at said source when said motor is in a non-operating condition.

4. A vehicle windshield wiper system comprising a windshield wiper, a wiper motor for driving said wiper, a source of vacuum generally providing energy for said motor, means for causing said motor to be either in an operating or non-operating condition, a compressor for providing a source of compressed air for the operation of vehicle accessories, a compressed air tank for storing compressed air produced by said compressor, and valve means for automatically causing the intake side of said compressor to communicate with the operating wiper motor and for causing the compressor output to be freely discharged when the vacuum in said source fluctuates to a low magnitude which would tend to cause the speed of said motor to be reduced below a predetermined value to thereby assure the providing of vacuum to said motor by said compressor when said tank is full, said valve means preventing said compressor output from being freely discharged when the vacuum in said source is at low magnitude and said motor is not in operation.

5. In combination in a vehicle: a vacuum operated windshield wiper system and a compressed air system; said windshield wiper system including a windshield wiper, a vacuum motor coupled to said wiper, and a source of vacuum for providing energy for driving said wiper motor within a given range of speeds; said compressed air system comprising a compressor for providing a source of compressed air for the operation of vehicle accessories and a compressed air tank coupled to said compressor; and valving means for both venting the output side of said compressor and coupling the intake side of said compressor to said wiper motor when said wiper motor is in operation and when said vacuum source produces a pressure which would cause the speed of said wiper motor to drop below said range of speeds, said valving means maintaining said compressed air system completely divorced from said wiper system when said wiper motor is not in operation.

6. In combination in a vehicle: a vacuum operated windshield wiper system for cleaning a windshield and a compressed air system for providing a source of compressed air for the operation of accessories in said vehicle, means for selectively causing the vacuum produced by the intake side of a compressor in said compressed air system to provide the vacuum for operation of said wiper system, said means maintaining said operating compressed air system completely divorced from said wiper system when said wiper system is not in operation.

References Cited in the file of this patent

UNITED STATES PATENTS

| | | |
|---|---|---|
| 2,348,346 | Horton et al. | May 9, 1944 |
| 2,520,650 | Oishei et al. | Aug. 29, 1950 |